US009097959B2

(12) United States Patent
Fong

(10) Patent No.: US 9,097,959 B2
(45) Date of Patent: Aug. 4, 2015

(54) COLLAPSIBLE PHOTOGRAPHIC LIGHT DIFFUSER

(75) Inventor: Gary Fong, Seattle, WA (US)

(73) Assignee: Gary Fong Photographic, Inc., Kelowna BC (CA)

( * ) Notice: Subject to any disclaimer, the term of this patent is extended or adjusted under 35 U.S.C. 154(b) by 166 days.

(21) Appl. No.: 12/604,378

(22) Filed: Oct. 22, 2009

(65) Prior Publication Data

US 2010/0118552 A1      May 13, 2010

Related U.S. Application Data

(60) Provisional application No. 61/197,073, filed on Oct. 22, 2008.

(51) Int. Cl.
| | | |
|---|---|---|
| G03B 15/06 | (2006.01) | |
| G02B 7/00 | (2006.01) | |
| G03B 17/56 | (2006.01) | |
| G02B 5/02 | (2006.01) | |

(52) U.S. Cl.
CPC .............. *G03B 15/06* (2013.01); *G02B 7/006* (2013.01); *G03B 17/566* (2013.01); *G02B 5/0205* (2013.01); *G02B 5/0278* (2013.01)

(58) Field of Classification Search
USPC .................. 362/355, 356, 3–18, 277, 317
See application file for complete search history.

(56) References Cited

U.S. PATENT DOCUMENTS

| | | | | |
|---|---|---|---|---|
| 2,880,902 | A | * | 4/1959 | Owsen ............................. 220/8 |
| 3,774,992 | A | | 11/1973 | Steiner |
| 4,075,472 | A | | 2/1978 | Higuchi |
| 4,927,238 | A | | 5/1990 | Green et al. |
| 5,311,409 | A | * | 5/1994 | King ................................ 362/17 |
| 5,651,602 | A | * | 7/1997 | Tawil et al. ...................... 362/18 |
| 5,915,828 | A | * | 6/1999 | Buckley .......................... 362/293 |
| 6,519,089 | B2 | * | 2/2003 | Graham .......................... 359/599 |
| 6,609,803 | B2 | * | 8/2003 | Lichfield ......................... 362/16 |
| 7,380,966 | B2 | | 6/2008 | Fong |
| 7,722,201 | B2 | * | 5/2010 | Manger ........................... 362/18 |
| 2002/0025157 | A1 | * | 2/2002 | Kawakami ..................... 396/155 |
| 2004/0020524 | A1 | * | 2/2004 | McConnell ...................... 135/66 |
| 2006/0109640 | A1 | | 5/2006 | Fong |
| 2006/0109641 | A1 | * | 5/2006 | Fong ................................ 362/16 |
| 2008/0204883 | A1 | | 8/2008 | Fong |

OTHER PUBLICATIONS

Extended European Search Report dated Mar. 25, 2013 issued in corresponding European Patent Application No. 09822745.7-1504/2350707, 8 pages.

(Continued)

*Primary Examiner* — Jong-Suk (James) Lee
*Assistant Examiner* — Leah S Macchiarolo
(74) *Attorney, Agent, or Firm* — Christie, Parker & Hale, LLP

(57) ABSTRACT

A portable photographic light diffuser is configured to be mounted to a photographic light source on a camera, the portable photographic light diffuser including a base adapted to engage the photographic light source on the camera, the base defining a socket; and a cowl extending from the base, the cowl being transformable between an expanded configuration, wherein the cowl extends by a first length from the base, and a collapsed configuration, wherein the cowl extends by a second length from the base, the second length being less than the first length.

18 Claims, 13 Drawing Sheets

(56) References Cited

OTHER PUBLICATIONS

Chinese Third Office action dated May 28, 2014 issued in corresponding Chinese Application No. 200980147927.5, with English translation, 7 pages.
Chinese First Office action dated Dec. 19, 2012 issued in corresponding Chinese Patent Application No. 200980147927.5, with English translation, 13 pages.
Chinese Second Office action dated Aug. 23, 2013 issued in corresponding Chinese Patent Application No. 200980147927.5, with English translation, 11 pages.
Decision of Final Rejection issued on Dec. 12, 2014 in corresponding Chinese Application No. 200980147927.5 based on PCT/US2009/061751, with English translation, 12 pages.

* cited by examiner

COLLAPSIBLE PHOTOGRAPHIC LIGHT DIFFUSER

CROSS-REFERENCE TO RELATED APPLICATION(S)

This application claims the benefit of U.S. Provisional Patent Application No. 61/197,073 filed in the U.S. Patent and Trademark Office on Oct. 22, 2008, the entire content of which is incorporated herein by reference.

BACKGROUND

Diffuse lighting accessories are photography devices commonly used to provide soft lighting effects in photographs. To achieve a diffuse lighting effect, light can be either directly or indirectly passed through a semi-transparent material, or it may be reflected off a material that will cause it to scatter somewhat. Such diffuse lighting is commonly produced by light sources that are remote from the camera. Typically, such light diffusers are provided by stationary screens, umbrellas, soft boxes and the like. Such devices provide excellent lighting effects in fixed studio settings where there is no need to transport the lighting equipment, including the diffusers, from place to place.

Each particular shot to be lighted dictates the type and intensity of light needed to properly illuminate the subject. In some situations, direct light from a light source without any alteration may be required. In other situations, direct lighting may be too strong or cast overly distinct shadows, in which case a more diffuse light is desirable. In still other cases, an even more indirect diffuse light may be needed to create the proper lighting effect. It is important to have a certain amount of uniformity in the lighting used to illuminate the subject. This uniformity may be achieved using typical stationary diffusers provided that the equipment is of good quality and is employed in the proper fashion.

While the equipment described above provides good lighting effects in a fixed studio setting, it can be inconvenient if not impossible to use such stationary lighting accessories outside of the photography studio. For shoots that require the photographer to be mobile, especially shoots where the photographer must capture action shots or cannot otherwise pose his subject, a small portable diffuser may be used which attaches directly to the camera itself. Such a light diffuser may be placed directly over an on-camera flash to provide a semi-transparent barrier to clear light transmission. Known diffusers exist which are small and portable with the camera and flash itself, and these diffusers are used by photographers in shoots where it is impractical to employ fixed lighting equipment.

SUMMARY OF THE INVENTION

A portable photographic light diffuser is provided and configured to be mounted to a photographic light source on a camera, the portable photographic light diffuser including a base adapted to engage the photographic light source on the camera, the base defining a socket; and a cowl extending from the base, the cowl being transformable between an expanded configuration, wherein the cowl extends by a first length from the base, and a collapsed configuration, wherein the cowl extends by a second length from the base, the second length being less than the first length.

More specifically, in one embodiment, the cowl has a collapsible portion attached to the base and adapted to be folded to reduce a distance by which a distal end of the cowl extends from the base. Further, a distal portion may be attached to the collapsible portion, the distal portion extending away from the base, wherein at least a section of the distal portion overlaps with at least a section of the collapsible portion in the collapsed configuration. In one embodiment, the collapsible portion tapers outwardly in a direction from the base toward the cowl. The cowl may include a plurality of ribs on an interior surface of the cowl, and the ribs may be integral with the cowl.

Further, in one embodiment, the light diffuser may include a sizing insert within the base, the sizing insert dimensioned to attach the base to the photographic light source. The sizing insert may have a plurality of fins for contacting the photographic light source. In another embodiment, the base itself has fin integrally extending therefrom for contacting the photographic light source. Additionally, an accessory gel may be provided to cover the socket to influence a color of light emitted through the diffuser. The accessory gel may be attached to pegs extending from a flange defined by the base. A cover may be used with the light diffuser, and the cover may be dome-shaped and configured to fit on the diffuser with the dome shape protruding away from or towards the base.

In one embodiment, the portable photographic light diffuser is a single integral component and it may be formed from a polymer resin.

DETAILED DESCRIPTION

Embodiments of the present photographic light diffuser provide high quality lighting effects when used with on-camera flashes, allowing photographers to achieve studio-quality lighting using electronic on-camera flashes without the need for separate lighting equipment. By doing so, the present diffuser eliminates the need to carry around and use cumbersome lighting equipment such as brackets, umbrellas, soft boxes and the like, allowing for truly mobile, spontaneous photography. Other diffusers that also provide for high quality lighting effects when used with on-camera flashes are described in U.S. Pat. No. 7,380,966 (Fong) and U.S. Pat. Pub. No. 2006/0109640 (Fong), the entire content of which are incorporated herein by reference.

Further, embodiments of the diffuser of the present invention permit the size of the diffuser to be reduced for storage and travel convenience. Additionally, the diffuser may be adapted to be mounted to differently sized light sources and may alter the color of the light emitted through the diffuser from the light source. As used herein, a "proximal end" of the diffuser is defined as a surface edge of a base of the diffuser and a "distal end" of the diffuser is defined as a surface edge of a cowl of the diffuser, as described in more detail below. Further, a "proximal direction" is defined as a direction from the cowl toward the base and a "distal direction" is defined as a direction from the base toward the cowl.

Figure 1:
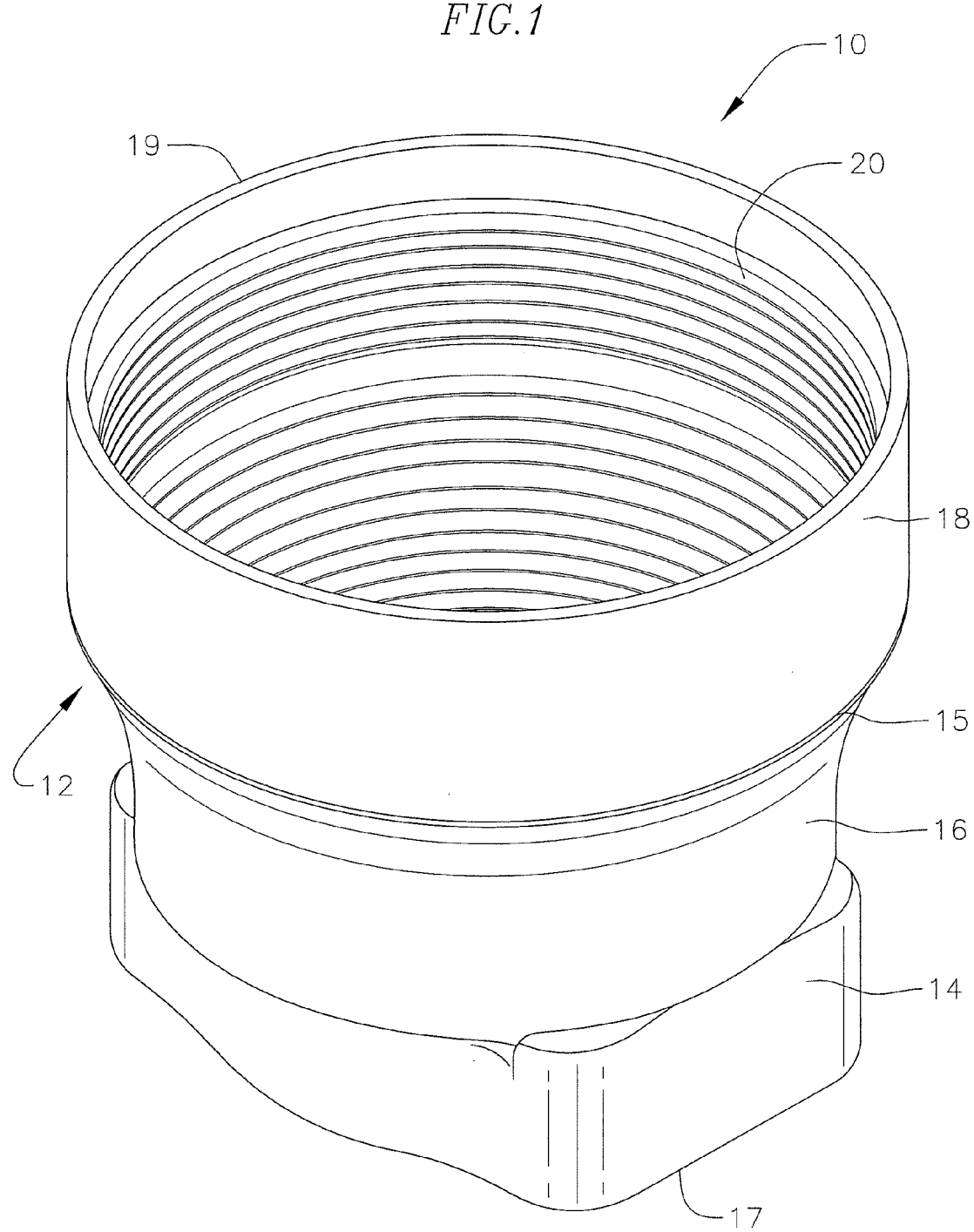
FIG. 1 is an orthogonal view of a collapsible photographic light diffuser according to an embodiment of the present invention.

FIG. 1 shows an orthogonal view of a photographic light diffuser 10 according to one embodiment of the present invention. The diffuser 10 is generally formed from a flexible or elastic material, and in one embodiment, the diffuser is formed from a polymer resin using a vacuum molding process. More specifically, the diffuser 10 may be formed from an elastomeric material such as vinyl. The diffuser 10 may also be made from other molding and non-molding forming processes, as well as being formed from other appropriate semi-transparent or translucent materials as will be understood by one skilled in the art. The mold surface may be roughened to provide the diffuser 10 with a semi-transparent or translucent finish. This roughened surface may be created by treating the mold with a sand or bead blasting process.

As shown in the embodiment of FIG. 1, the diffuser 10 is provided having a collapsible cowl 12 extending from a base 14. The base 14 is configured to allow the diffuser 10 to attach directly to the head of a flash on the camera and, in one embodiment, the base 14 may be friction fitted to the head of the flash. In alternative embodiments, the base 14 of the diffuser 10 may be mounted on the flash using a bracket or insert permanently or removably attached to the flash unit, or it may be mounted using a threaded collar, a bayonet style mount, using Velcro, or by other appropriate methods known to those skilled in the art.

In one embodiment, the base 14 has a minimum length of about one half inch to permit the base to fit over a flash, as well as to provide a socket defined by four generally parallel side walls between a proximal end of the flash and the cowl 12 through which light from the flash travels. This relatively small generally rectangular area allows the base to be conformed to the shape of many on-camera flashes and also adds an amount of direct or specular lighting to the flash effect created by the diffuser 10. This effect is caused by the close proximity of the side walls of the diffuser 10 in the area of the base 14 to the flash itself, causing light to be refracted through this area of the diffuser 10 with a greater intensity than through the tapered cylindrical portion 16 or the distal portion 18 of the diffuser 10.

Accordingly, the lighting properties of the diffuser 10 can be varied by varying the relative proportions of the diffuser 10, specifically the length and breadth of the passage through the generally rectangular base 14 with respect to the size of a tapered cylindrical portion 16 or a distal portion 18 of the diffuser 10, as described in more detail below. A shorter passage and a larger tapered cylindrical body would cause the diffuser 10 to provide less of a direct and more of a diffused lighting effect. Conversely, a relatively longer passage and smaller tapered cylindrical body would affect the balance of the lighting effect created by the diffuser 10 in the opposite manner.

While the purpose of the diffuser 10 is to ameliorate the harsh effects of direct lighting, some amount of direct light, or "key light" is desirable to provide an amount of specularity in an exposed image. The higher intensity gives a catchlight to the eyes of photographic subjects and prevents the image from appearing too soft. The compound geometry in the present diffuser 10 is designed to strike a balance between an image that is too harsh and one that is too soft.

Figure 2:
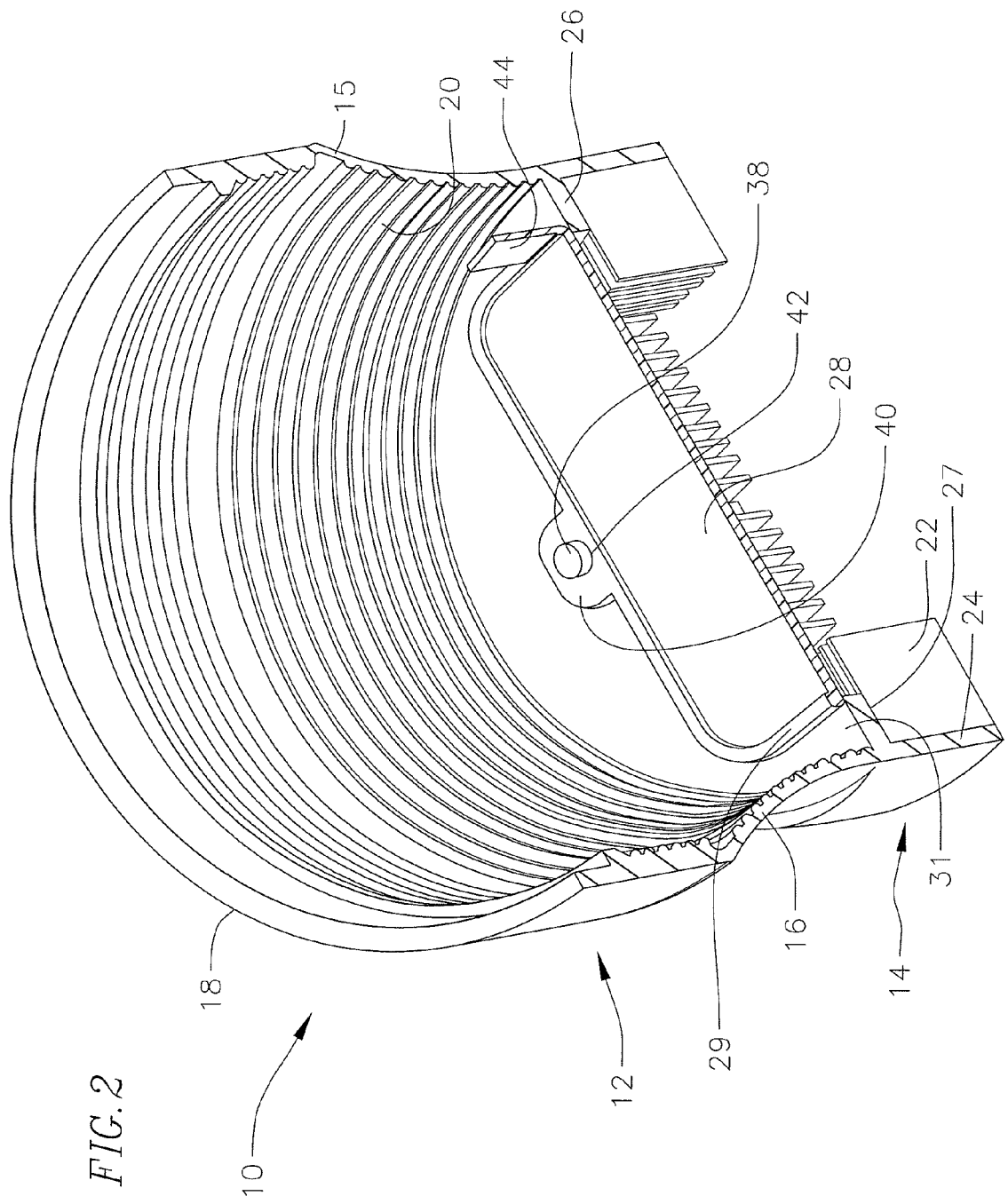
FIG. 2 is a cutaway orthogonal view of the collapsible photographic light diffuser of FIG. 1.
Figure 3:
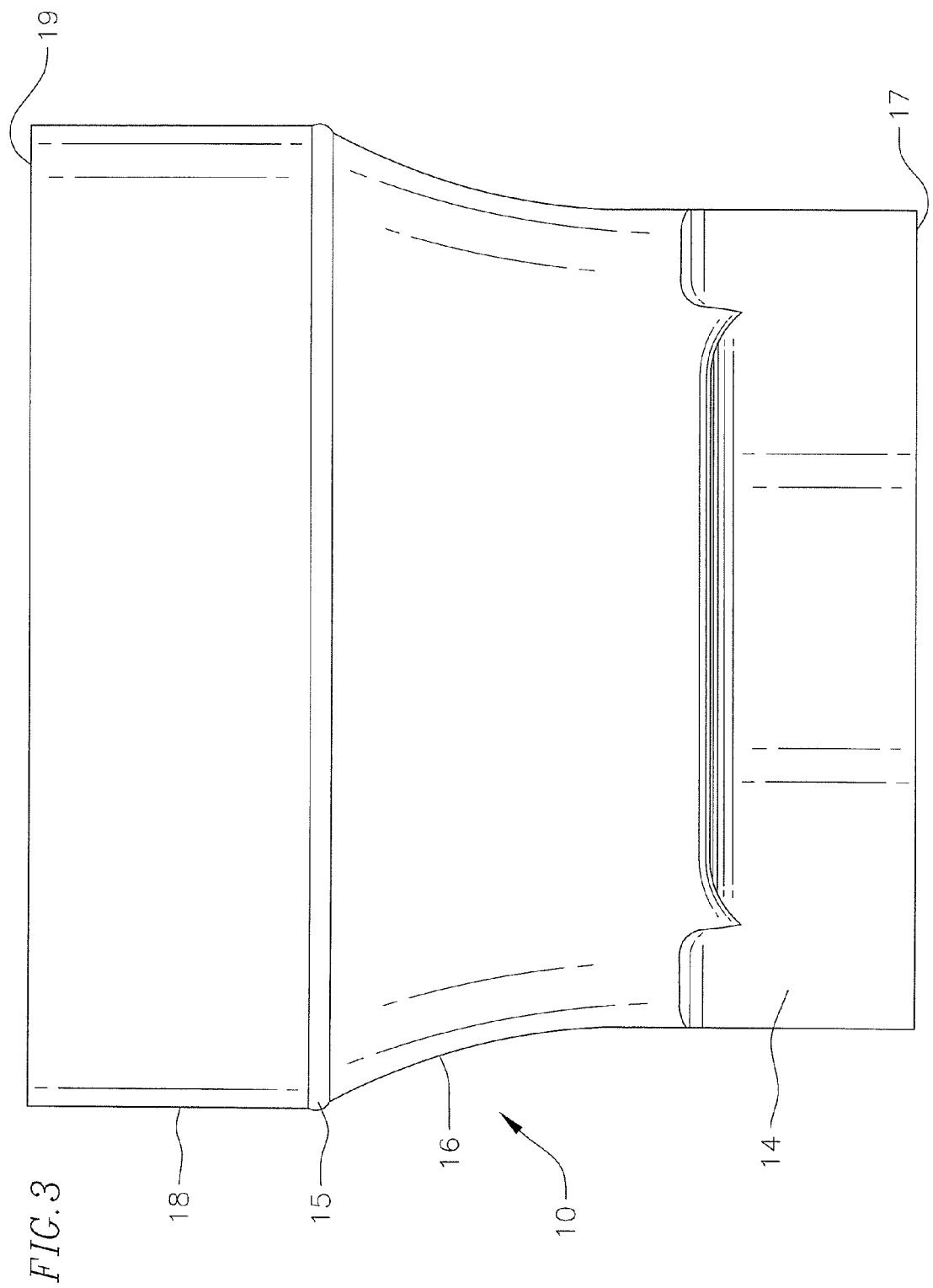
FIG. 3 is a side view of the collapsible photographic light diffuser of FIG. 1.

As shown in FIGS. 1-3, the cowl 12 is generally divided between a collapsible portion 16 extending from the base 14 and a distal portion 18 extending from the collapsible portion and configured to accommodate a cover 46, as described in more detail below. In one embodiment as shown, the collapsible portion 16 is tapered and the taper angle may gradually decline until the collapsible portion is substantially parallel with an edge of the base 14 where the collapsible portion meets the base. However, the angle of the collapsible portion 16 may also be constant along the length of the taper. In one embodiment, the collapsible portion 16 and the distal portion 18 are a single integral component divided by a seam 15, but as will be appreciated, the components may also be separate and attached together. Further, it will be appreciated that the collapsible portion 16 does not need to be tapered at all, but may instead have a shape that allows it to collapse, such as a bellowed or accordion shape.

In one embodiment, ribs 20 extend along an inside surface in the collapsible portion 16 and distal portion 18 of the cowl 12. The ribs 20 can extend in parallel around an inner circumference of the collapsible and distal portions 16, 18, but as will be appreciated, the ribs may also extend substantially parallel in a direction from the base 14 toward the distal portion 18 or in a diagonal direction. The ribs 20 can also extend on an outer surface of the cowl 12, and in general allow light to be more effectively diffused as it passes through the cowl 12 and into the area in which a photograph is being taken. Additionally, the ribs 20 may be entirely absent from the diffuser 10.

Figure 10:
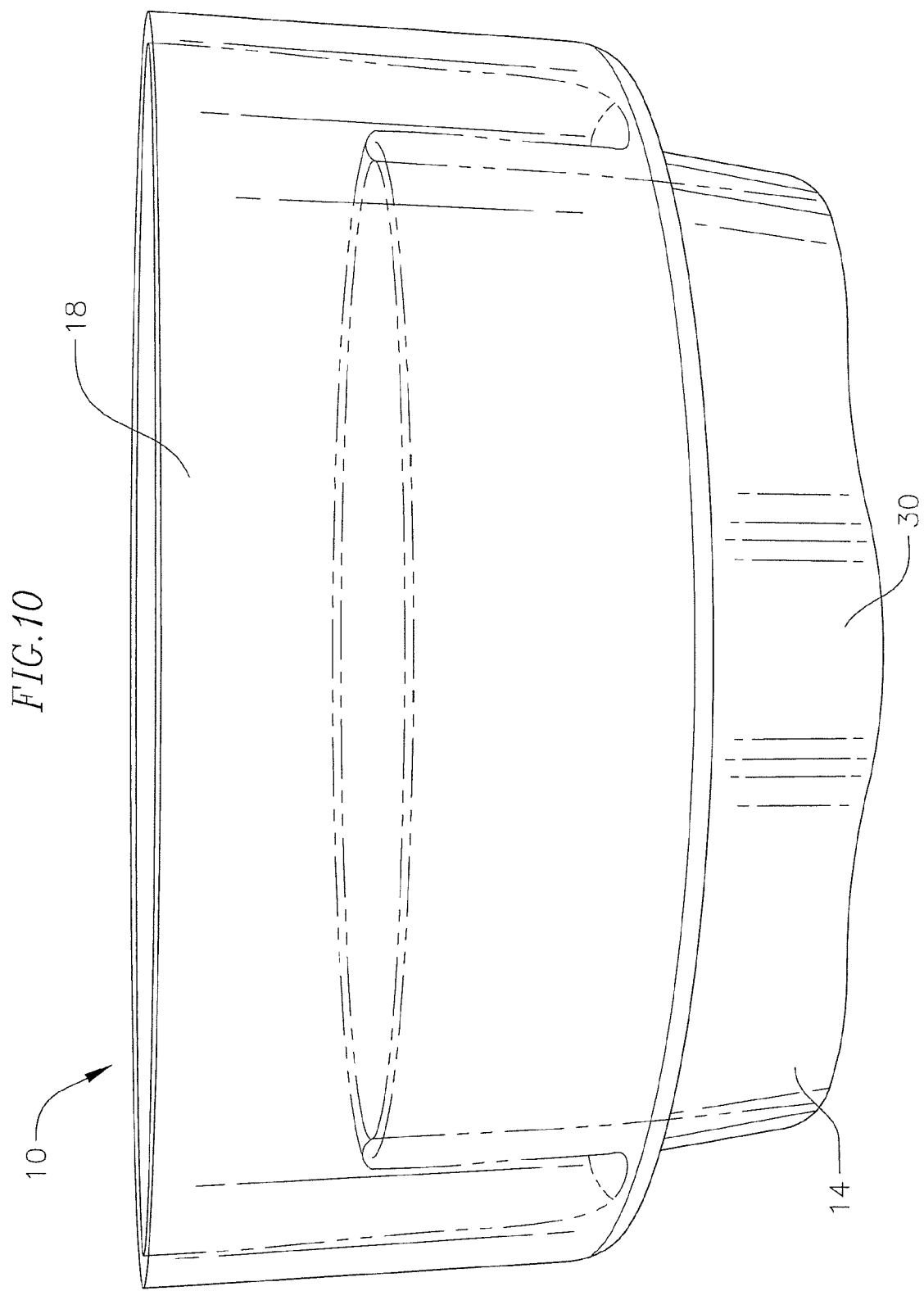
FIG. 10 is a side view of the collapsible photographic light diffuser of FIG. 1 in a collapsed configuration.
Figure 11:
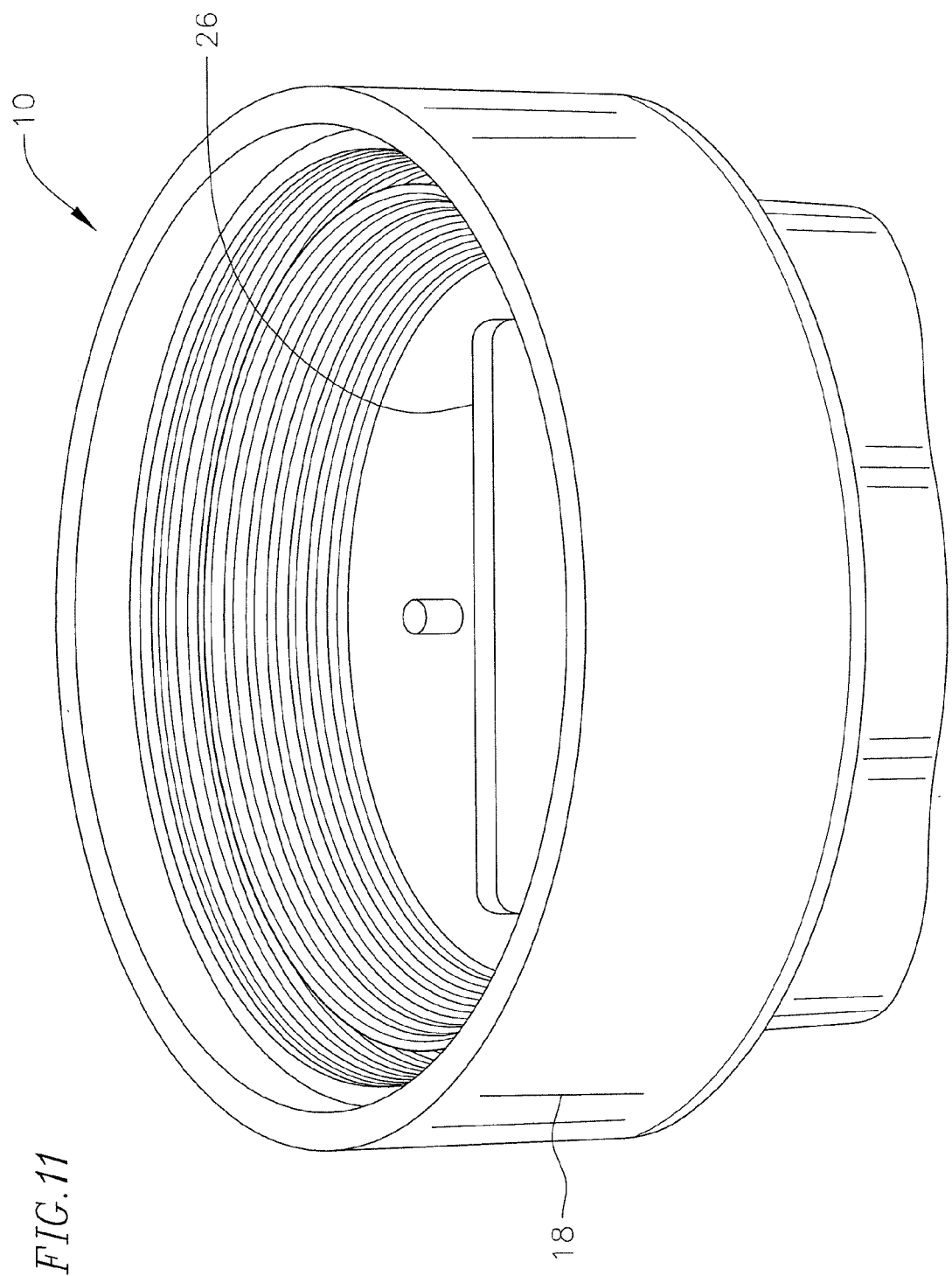
FIG. 11 is a perspective view of the collapsible photographic light diffuser of FIG. 1 in a collapsed configuration.

The cowl 12 comprises a relatively flexible material that is rigid enough to allow the cowl to maintain its shape when attached to a flash, but is flexible enough to allow the cowl to be collapsed, thereby allowing the diffuser to be reduced in size, and particularly reduced in length. As will be appreciated, the diffuser 10 may be transferred between an expanded configuration (FIG. 1) in which it has a first length from the proximal end 17 to a distal end 19 and a collapsed configuration (FIG. 10) in which it has a shorter second length from the proximal end 17 to the distal end 19. With reference now also to FIGS. 10 and 11 showing the diffuser 10 in the collapsed configuration, the collapsible portion 16 of the cowl 12 can be folded from the expanded configuration such that the distal portion 18 is moved proximally toward the base 14, and more specifically such that the seam 15 moves towards and, in some cases overlaps with at least a portion of the base. As also shown in FIGS. 1 and 3, the outward tapering of the collapsible portion 16 in the distal direction permits the collapsible portion to be folded onto itself when an axial force is applied to the cowl in the proximal direction. In the collapsed configuration, the diffuser consumes less space, allowing it be more easily stored and carried. When the user wants to use the diffuser, an axial force may be applied in the distal direction to transform the cowl from the collapsed configuration to the expanded configuration.

Figure 4:
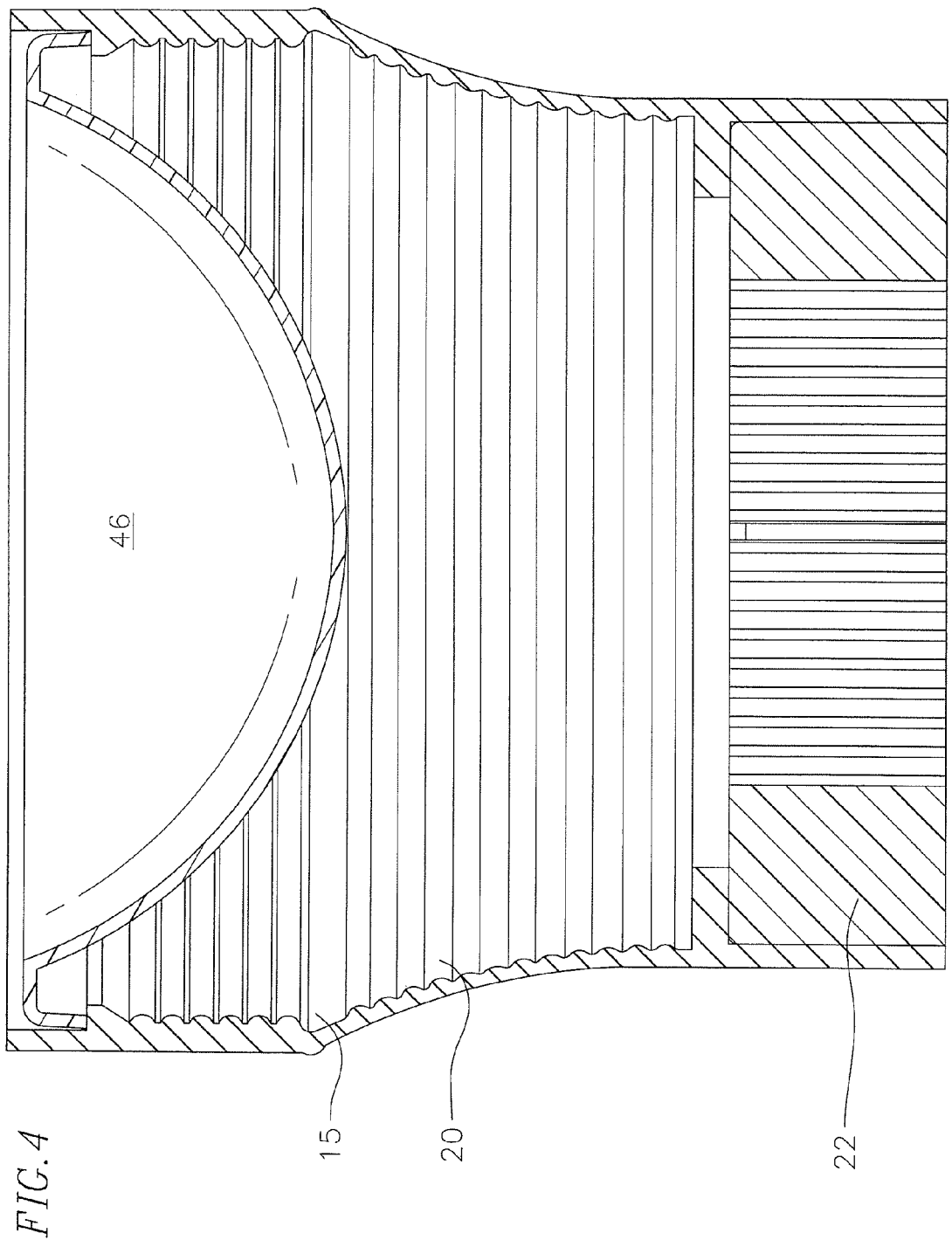
FIG. 4 is a cross-sectional side view of the collapsible photographic light diffuser of FIG. 1.
Figure 5:
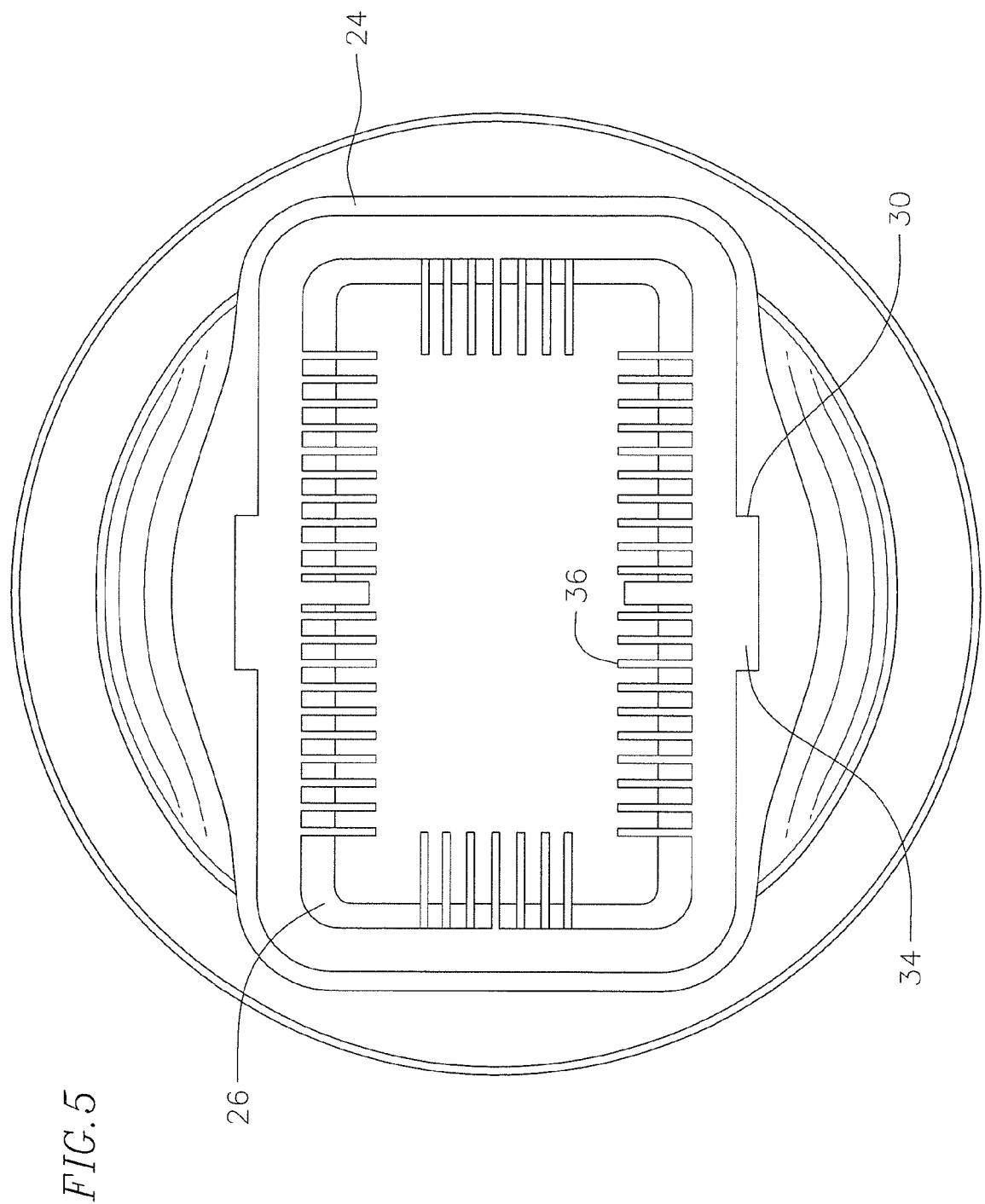
FIG. 5 is a bottom view of the collapsible photographic light diffuser of FIG. 1.
Figure 6:
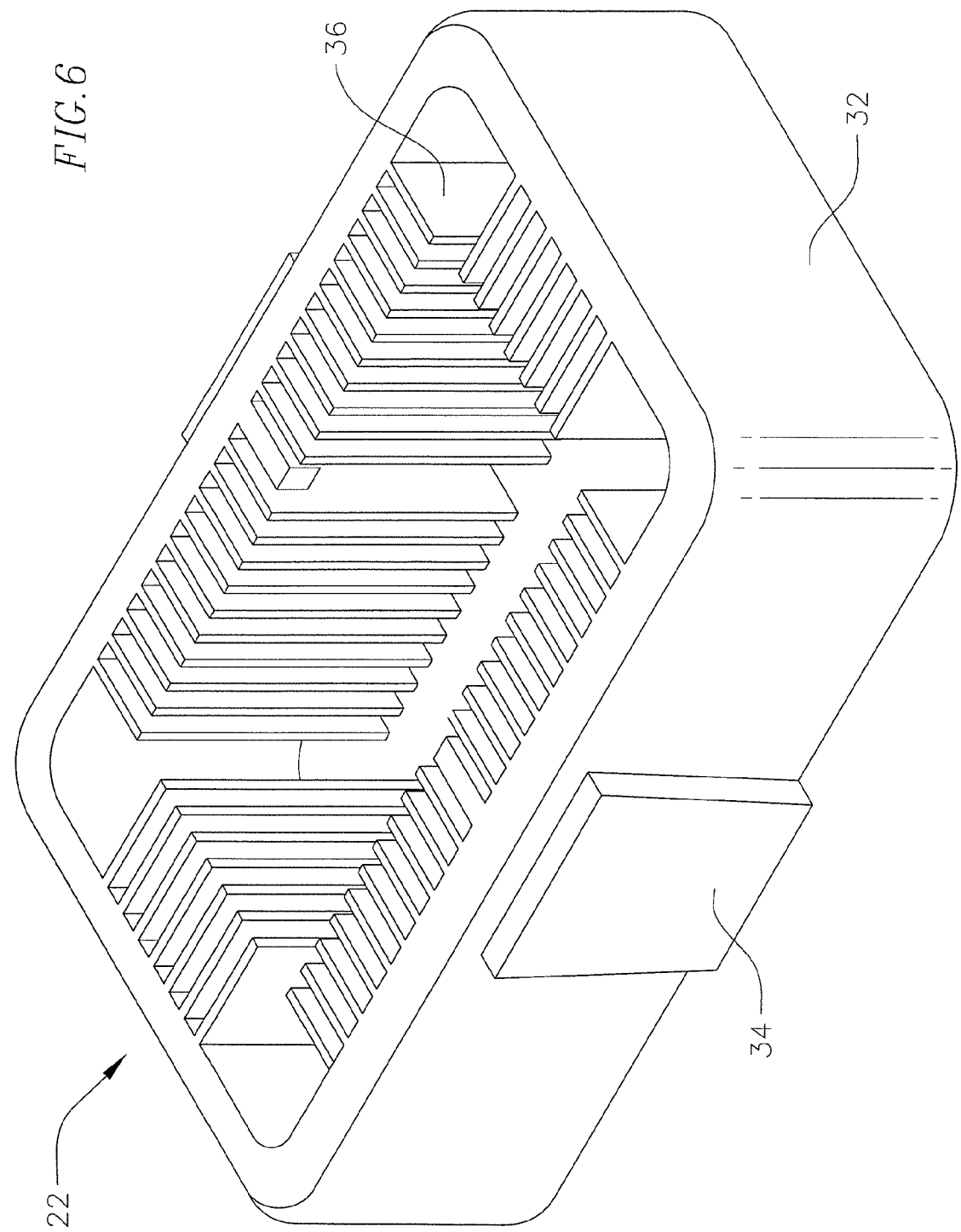
FIG. 6 is an orthogonal view of an embodiment of a sizing insert for use with the collapsible photographic light diffuser of FIG. 1.

With reference now to FIGS. 4-6, the base 14 of the diffuser 10 is configured to receive a sizing and mounting insert 22 that serves to secure the diffuser to a flash and also allows the diffuser to be adapted to differently sized flashes, as necessary. With reference also to FIG. 2, the base 14 has side walls 24 generally defining a rectangular socket and a flange 26 extending from a distal end of the side walls. The proximal facing surface 27 of the flange 26 defines a surface against which the insert 22 abuts and the distal facing surface of the flange defines a surface for holding an accessory gel 28, as described in more detail below. As will be appreciated, the base 14 is not limited to being rectangular, but rather may be a variety of different shapes, such as circular, polygonal, or an irregular shape.

With reference also to FIG. 5, in one embodiment, two side walls 24 of the base 14 have notches 30 for receiving protrusions 34 on the side walls 32 of the insert 22 (FIG. 6), the notches serving to increase surface area contact between the base and the insert to thereby better retain the insert in the base. The insert 22 may also be retained within the base 14 by additional protrusions and notches or by a variety of other mechanisms, such as a detent system or a snap-lock system, or the insert may be integral with or permanently attached to the base.

As also shown in FIG. 6, the insert 22 includes side walls 32 generally defining a perimeter, and a plurality of fins 36 protruding toward a center of the insert from each side wall. In one embodiment, the fins 36 are relatively numerous, thin and flexible, providing a relatively large number of contact points for engaging the flash and having a relatively large surface interface for contacting the flash to thereby secure the diffuser 10 to the flash. As shown, the fins 36 integrally protrude from each side wall 32 and are generally evenly spaced along the side walls, but it will be appreciated that the fins could be irregularly spaced and may protrude from only some or one of the side walls. Additionally, the fins may be all the same length or different lengths, depending on the user's requirements and the shape and size of the flash. As will be appreciated, the diffuser 10 may also be attached directly to a flash without the insert 22, and the side walls 24 of the base 14 may have protruding fins or contact arms for additional security if necessary.

With reference again to FIG. 2, the distal facing surface 31 of the flange 26 supports an accessory gel 28 that covers the socket between the base 14 and the cowl 12. In one embodiment, the accessory gel 28 may be a generally flat and flexible sheet sized to generally cover the socket defined by the base 14. A perimeter 29 of the gel 28 may be thicker than the rest of the gel for structural support. The accessory gel 28 may be translucent and may be one of a variety of colors, such as red, green, blue or amber, to alter the color of the light passing through the diffuser 10 from the base 14 to the cowl 12. A tab 40 having an opening 42 may extend from the perimeter 29 of the accessory gel 28 for attaching the gel to the flange 26. More specifically, the flange 26 of the base 14 may include two pegs 38 onto which the openings 42 on the tabs 40 may be inserted to frictionally engage the gel 28 and thereby attach the gel within in the diffuser 10. The gel 28 may also include a release tab 44 extending from the gel on which a user can pull to disengage the gel from the pegs 38.

Figure 9:
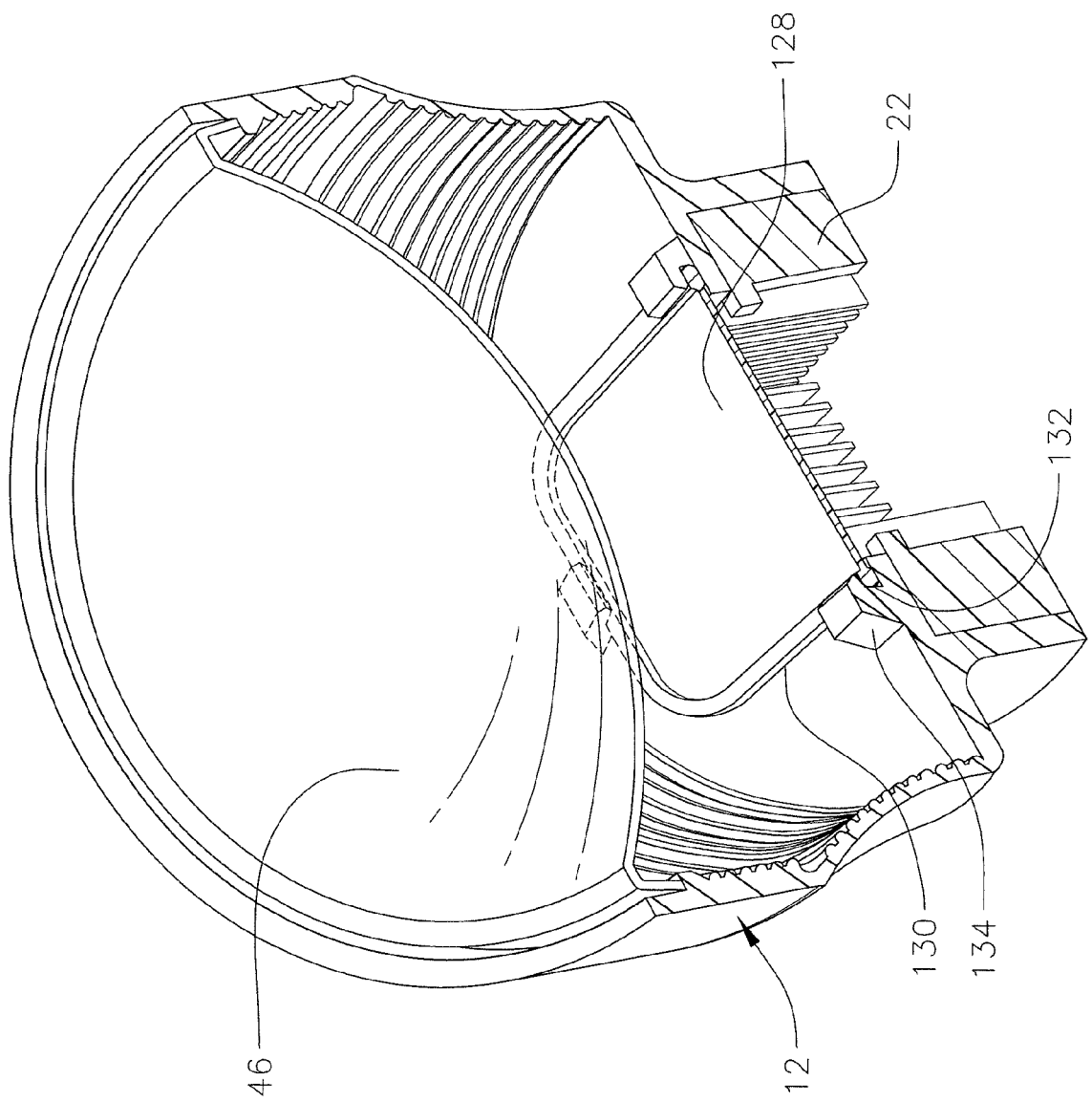
FIG. 9 is a cutaway orthogonal view of an alternative embodiment of a collapsible photographic light diffuser of the present invention.

In an alternate embodiment, as shown in FIG. 9, a flange 126 includes a plurality of notches 132 defined by raised protrusions 134 located proximate a perimeter of the socket. A raised perimeter 130 of a gel 128 may be snapped into the notches 132 to secure the gel to the flange 126. As will be appreciated, other attachment devices may also be used to attach a gel to the flange.

Figure 7:
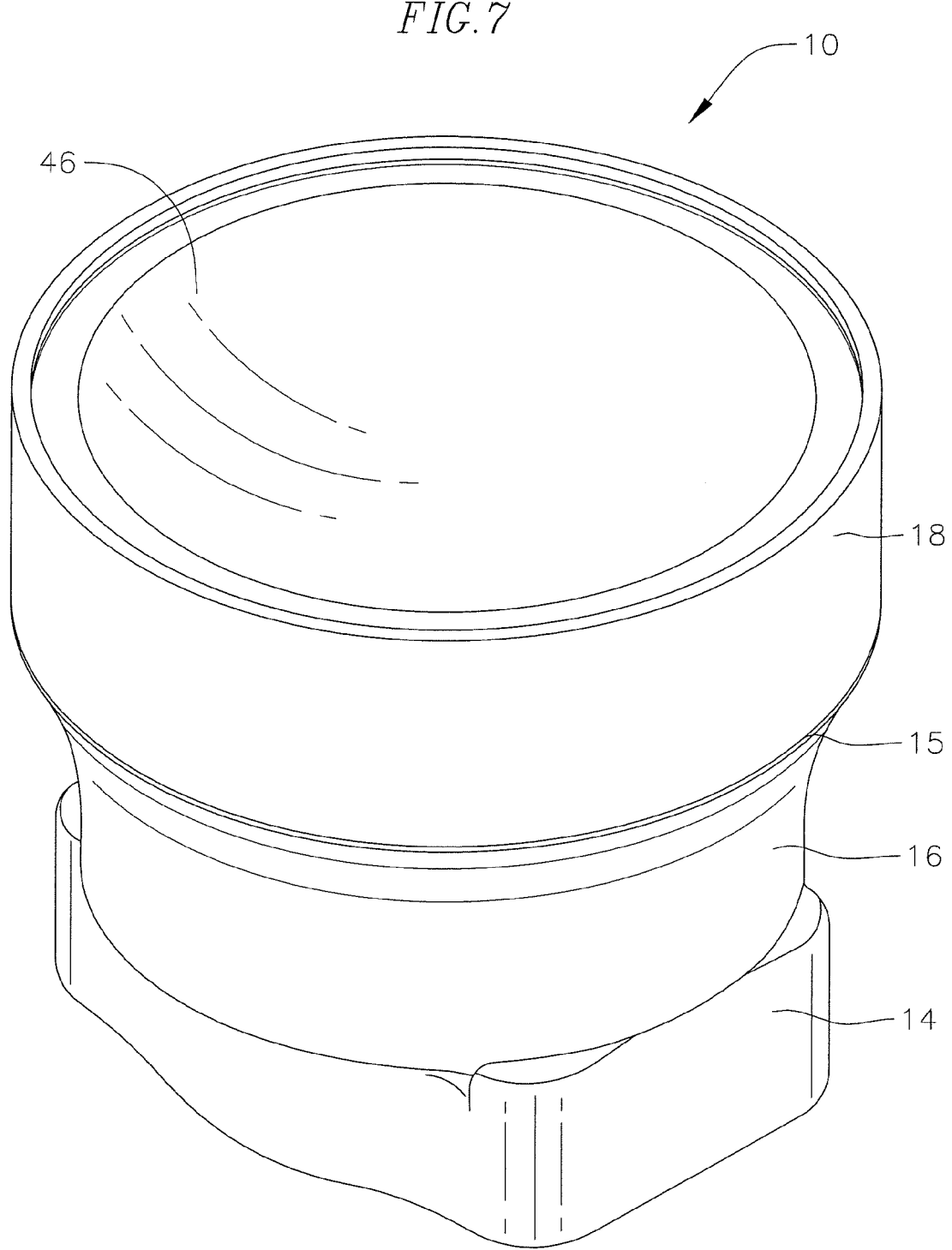
FIG. 7 is an orthogonal view of the collapsible photographic light diffuser of FIG. 1 having a cover within a cowl.
Figure 8:
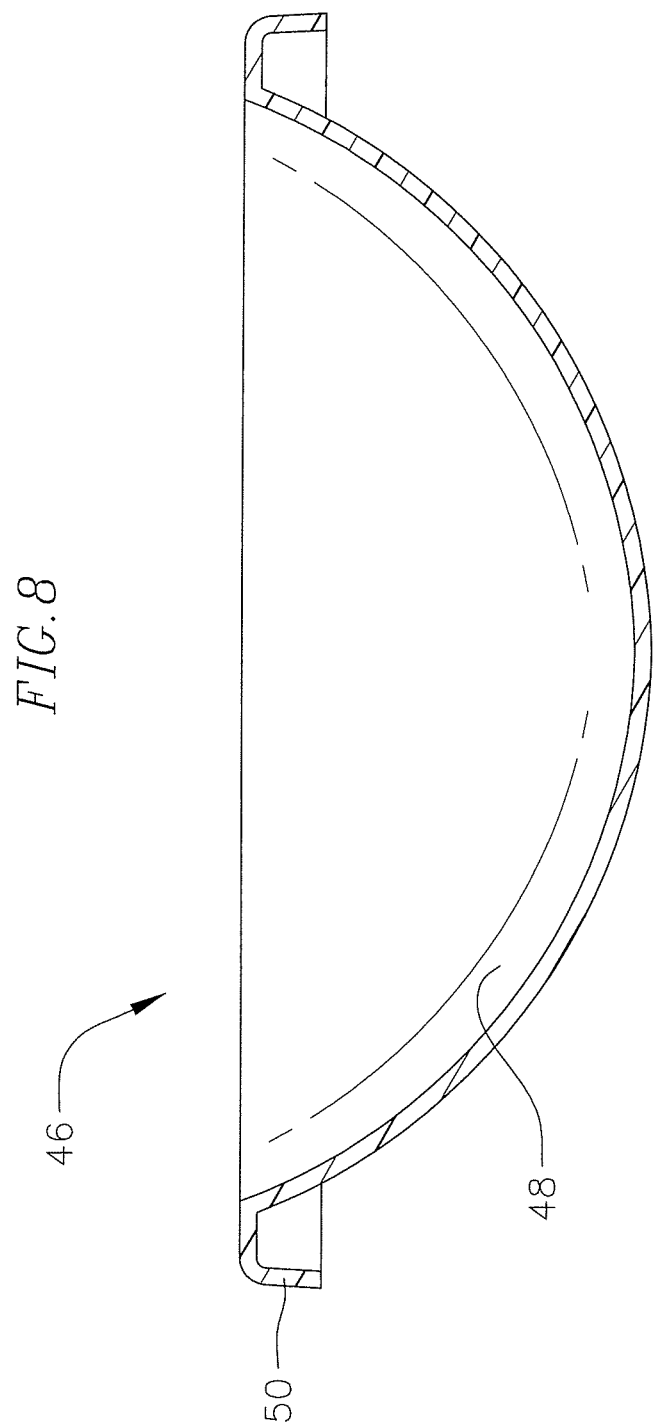
FIG. 8 is a cross-sectional view of a cover for the collapsible photographic light diffuser of FIG. 1.

The cowl 12 can be used by itself or in conjunction with a cover 46 as shown in FIGS. 4, 7 and 8. In one embodiment, the cover 46 comprises a dome body 48 and a flange 50 curled back toward the base 14 of the diffuser 10. In one embodiment, the flange 50 frictionally engages an interior surface of the cowl 12 and the cover 46 may rest on a distal most rib 20 or a shelf located proximate the distal end 19 of the cowl. The cover 46 may be used in a concave or convex configuration and the flange 50 will frictionally support the cover in either direction. The cover 46 may have a smooth surface or optionally include ribs. In another embodiment, the flange 50 may attach to a rim of the cowl 12 and be frictionally engaged thereto.

When the cowl 12 is used without a cover, the light from the flash escapes from the top without being diffused, throwing a concentration of direct light upward into the surrounding area. In an enclosed space, the direct light can lighten the room in colliding with the ceiling, without casting the harsh light of the flash directly onto the subject. An upper portion of the body portion of the cowl 12 can be trimmed around a circumference of the cowl as desired to allow a greater amount of light to escape from the top without being diffused.

Figure 12:
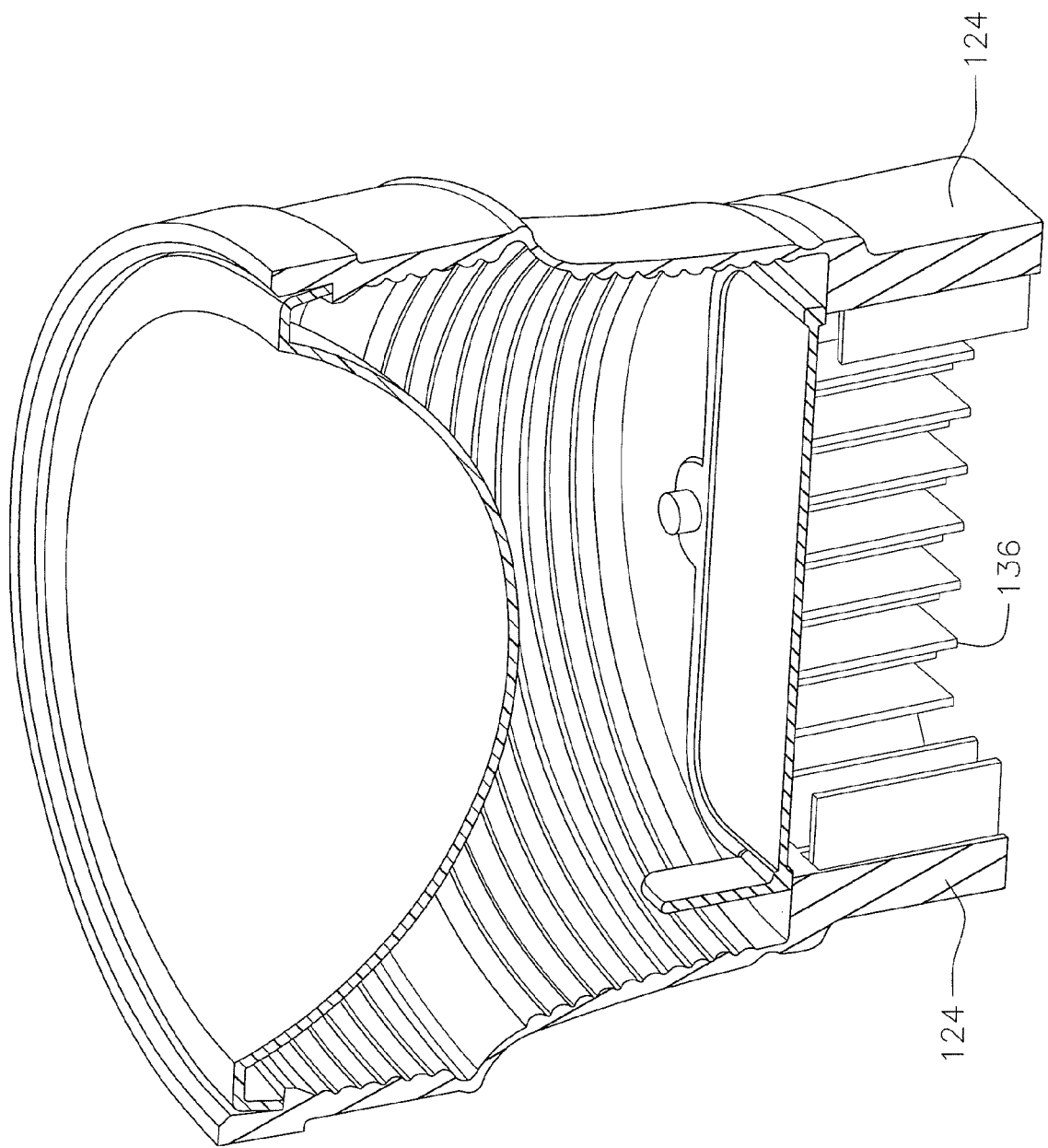
FIG. 12 is a cutaway orthogonal view of yet another alternative embodiment of the a collapsible light diffuser of the present invention.
Figure 13:
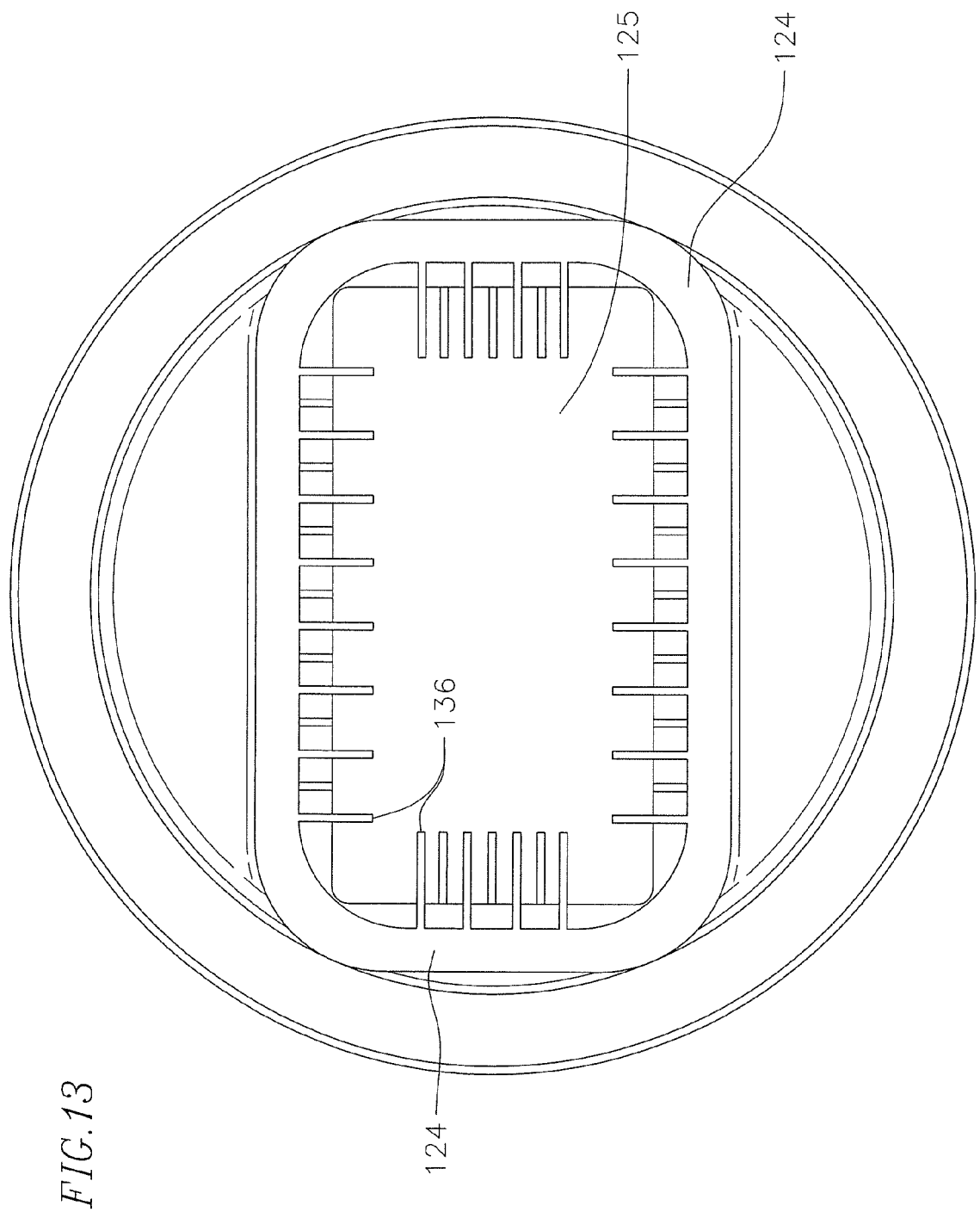
FIG. 13 is a bottom view of the collapsible light diffuser of FIG. 12.

With reference now to FIGS. 12 and 13, another embodiment of a collapsible light diffuser 100 is shown. The light diffuser 100 is similar to the light diffuser 10 described with respect to previous embodiments so only the differences will be highlighted.

As shown in the figures, the diffuser 100 has a base 114 having side walls 124 defining an opening 125 through which a photographic light source such as a camera flash can be inserted. An interior surface of the base 114 includes a plurality of fins 136 integral with and extending from each side wall, the fins configured to contact a light source inserted into the opening 125 and to thereby attach the diffuser 100 to the light source. Since the fins 136 are integral with the diffuser 100, an insert as described above is not necessary. In one embodiment, the fins 136 are relatively flexible to allow an interference fit between the diffuser 100 and the light source. With reference to FIG. 13, the fins 136 have different lengths, but it will be appreciated that the fins could have the same length.

While this invention has been described in connection with what is presently considered to be practical embodiments, it is to be understood that the invention is not limited to the disclosed embodiments, but rather is intended to cover various modifications and equivalent arrangements included within the spirit and scope of the appended claims, description, drawings and photographs.

What is claimed is:

1. A portable photographic light diffuser configured to be mounted to a photographic light source for a camera, the portable photographic light diffuser comprising:
    a base adapted to engage the photographic light source for the camera, the base defining a socket;
    a cowl extending from the base, the cowl having a distal portion and a collapsible portion between the distal portion and the base, the cowl being configured to transform by folding only the collapsible portion onto itself in a folding direction along an optical axis of the diffuser between an expanded configuration, wherein the cowl extends by a first length from the base, and a collapsed configuration, wherein the cowl extends by a second length from the base, the second length being less than the first length, wherein the collapsible portion inverts on itself when the cowl is moved into a telescoped relation in the folding direction; and
    a sizing insert removably coupled to the base, wherein the sizing insert has a plurality of fins adapted to contact the photographic light source.

2. The portable photographic light diffuser of claim 1, wherein the socket is substantially rectangular.

3. The portable photographic light diffuser of claim 1, wherein the collapsible portion is attached to the base and is adapted to be folded to reduce a distance by which a distal end of the cowl extends from the base.

4. The portable photographic light diffuser of claim 3, wherein the collapsible portion tapers outwardly in a direction from the base toward the cowl.

5. The portable photographic light diffuser of claim 3, wherein at least a section of the distal portion overlaps with at least a section of the collapsible portion in the collapsed configuration.

6. The portable photographic light diffuser of claim 1, wherein the cowl is substantially cylindrical.

7. The portable photographic light diffuser of claim 1, further comprising a plurality of ribs on an interior surface of the cowl.

8. The portable photographic light diffuser of claim 7, wherein the ribs are integral with the cowl.

9. The portable photographic light diffuser of claim 1, further comprising an accessory gel covering the socket to influence a color of light emitted through the diffuser.

10. The portable photographic light diffuser of claim 9, wherein the base defines a flange configured to accommodate the accessory gel, the flange having a plurality of pegs adapted to attach the accessory gel to the portable photographic light diffuser.

11. The portable photographic light diffuser of claim 1, further comprising a plurality of fins extending integrally from the base and configured to contact a photographic light source inserted into the socket.

12. The portable photographic light diffuser of claim 1, wherein the portable photographic light diffuser is a single integral component.

13. The portable photographic light diffuser of claim 1, wherein the portable photographic light diffuser comprises polymer resin.

14. The portable photographic light diffuser of claim 1, further comprising a removable cover.

15. The portable photographic light diffuser of claim 14, wherein the cover is dome-shaped.

16. The portable photographic light diffuser of claim 15, wherein the cover is configured to be attached to the cowl so that the dome shape can protrude either toward or away from the base.

17. A portable photographic light diffuser configured to be mounted to a photographic light source for a camera, the portable photographic light diffuser comprising:
 a base adapted to engage the photographic light source for the camera, the base defining a substantially rectangular socket;
 a cowl extending from the base, the cowl being transformable between an expanded configuration, wherein the cowl extends by a first length from the base, and a collapsed configuration, wherein the cowl extends by a second length from the base, the second length being less than the first length;
 wherein the cowl has a distal portion and a collapsible portion between the distal portion and the base, the collapsible portion having a substantially smooth outer surface and being adapted to be folded in a folding direction along an optical axis of the diffuser to reduce a distance by which a distal end of the cowl extends from the base such that the collapsible portion inverts on itself when the cowl is moved into a telescoped relation in the folding direction;
 wherein a shape of the distal portion of the cowl is maintained between the expanded configuration and the collapsed configuration; and
 a sizing insert removably coupled to the base, wherein the sizing insert has a plurality of fins adapted to contact the photographic light source.

18. The portable photographic light diffuser of claim 17, wherein the cowl is substantially cylindrical.

\* \* \* \* \*